United States Patent [19]

Ushiro

[11] Patent Number: 5,760,521
[45] Date of Patent: Jun. 2, 1998

[54] MOTOR HAVING GEAR FOR TRANSMITTING TORQUE AND SUBSTRATE WITH CUT-OUT SECTION BETWEEN COILS

[75] Inventor: Tatsuzo Ushiro, Kawaguchi, Japan

[73] Assignee: Canon Kabushiki Kaisha, Tokyo, Japan

[21] Appl. No.: 555,072

[22] Filed: Nov. 8, 1995

[30] Foreign Application Priority Data

Nov. 17, 1994 [JP] Japan .................... 6-283557

[51] Int. Cl.⁶ ............................................ H02K 1/22
[52] U.S. Cl. ................. 310/268; 310/67 R; 310/68 R; 310/254; 310/179
[58] Field of Search .................... 310/67 R, 68 R, 310/268, 254, 179

[56] References Cited

U.S. PATENT DOCUMENTS

| | | | |
|---|---|---|---|
| 4,374,336 | 2/1983 | Shimuzu | 310/154 |
| 4,423,359 | 12/1983 | Hashimoto | 318/6 |
| 4,961,017 | 10/1990 | Kakinoki et al. | 310/71 |
| 5,498,919 | 3/1996 | Bahn | 310/268 |

FOREIGN PATENT DOCUMENTS 1109275  7/1989  Japan .................... H02K 21/24

*Primary Examiner*—Steven L. Stephan
*Assistant Examiner*—Elvin G. Enad
*Attorney, Agent, or Firm*—Fitzpatrick, Cella, Harper & Scinto

[57] ABSTRACT

A motor comprising a rotor unit and a stator unit. The rotor unit includes a multipolar rotor magnet; a gear, disposed away from the center of rotation of the rotor unit with respect to the rotor magnet, for transmitting torque of the rotor unit to the outside; and a rotary shaft disposed at the center of rotation. The stator unit includes a substrate; and a plurality of coils disposed facing the rotor magnet on the substrate, the substrate having a cut-out section between at least two of the plurality of coils, with the cut-out section causing the outer peripheral section of the gear to be exposed.

17 Claims, 5 Drawing Sheets

MOTOR HAVING GEAR FOR TRANSMITTING TORQUE AND SUBSTRATE WITH CUT-OUT SECTION BETWEEN COILS

BACKGROUND OF THE INVENTION

1. Field of the Invention

The present invention relates to a motor suitable for use as a capstan motor for performing tape drive in a video tape recorder (hereinafter referred to as "VTR").

2. Description of the Related Art

A conventional VTR is provided with a capstan motor for driving and transporting a tape, like recording medium, along with a pinch roller, and a reel motor for winding up the transported tape. In addition, the VTR is provided with a tape guide disposed in place for winding the aforementioned tape around a cylinder, and a loading motor for drawing out the tape from a cassette, with a cylinder motor provided for the aforementioned cylinder for driving and rotating a magnetic head.

In recent years, however, to produce a smaller and cheaper video camera-VTR combination (camcorder) with low power consumption, tape winding by the aforementioned reel motor has been primarily performed by transmission of driving power from the capstan motor.

In particular, in recent years, to respond to the demand for smaller and thinner VTR mechanisms, a system has been disclosed, for example, in Japanese Patent Utility Model Laid-Open No. 1-109275 in which a gear is formed at the outer periphery of a rotor unit integrally with a rotor magnet to obtain driving power from a side face thereof. This system is suitable for producing thin and smaller VTR mechanisms because the driving power is extracted from a side of a capstan motor section via a transmission gear.

Figure 6:
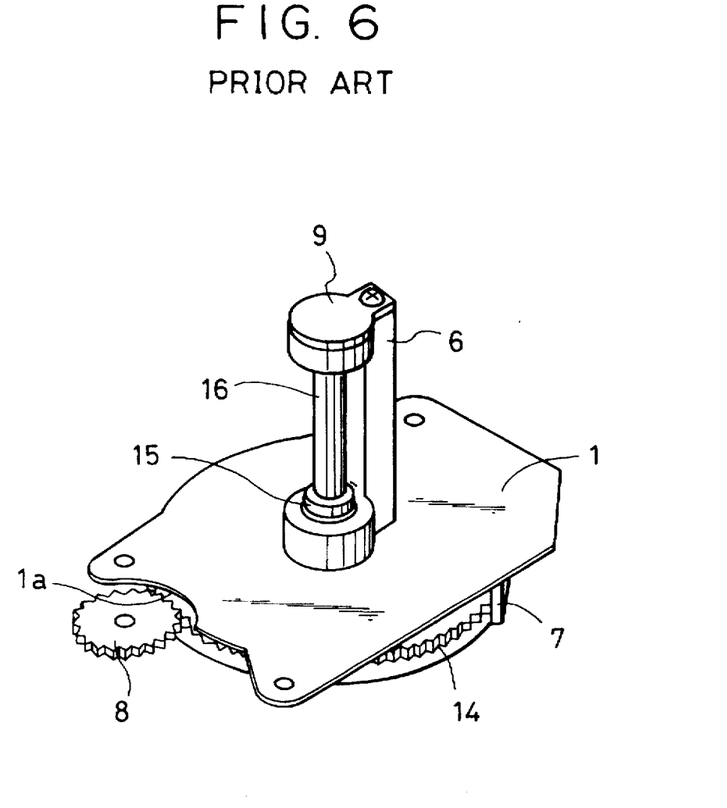
FIG. 6 is a perspective view of an appearance of a conventional capstan motor.

As illustrated in FIG. 6, which is a perspective view of an appearance of this type of capstan motor, in the conventional system in which driving power is extracted via a transmission gear formed at the outer periphery of the rotor unit, it is necessary, for assembly purposes, to cut out a portion of a stator (yoke) 1 where the transmission gear 8 (through which driving power is extracted) engages with an outer peripheral gear 14. The cut-out section is denoted by reference numeral 1a.

Figure 7:
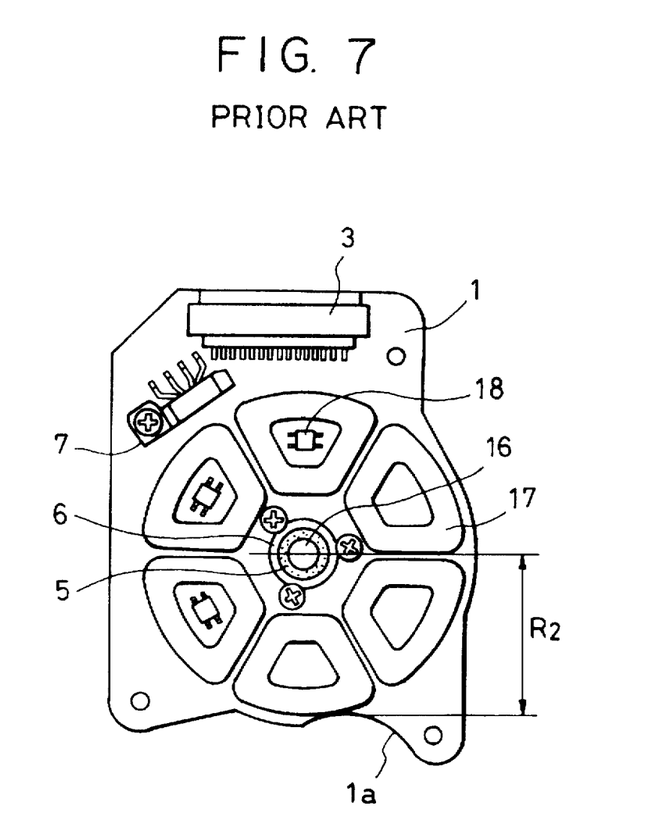
FIG. 7 is illustrative of the stator unit of FIG. 6.

Therefore, as in FIG. 7, which illustrates a stator unit of the motor, the driving power generating section, in particular the outer peripheral radius $R_2$ of each of the six driving coils 17, is very small compared to the outer periphery of the motor, making it necessary to maintain the required motor characteristics by making the motor thicker, making the driving magnet more magnetic, etc.

Referring to FIGS. 6 and 7, reference numeral 3 denotes a wiring connector to a motor drive circuit (not shown), reference numeral 5 denotes a bearing metal, reference numeral 6 denotes a bearing housing, reference numeral 7 denotes a magnetic resistance (MR) element, reference numeral 9 denotes a holder, reference numeral 14 denotes an outer periphery gear, reference numeral 15 denotes a grease retainer, reference numeral 16 denotes a capstan shaft, and reference numeral 18 denotes a Hall device.

SUMMARY OF THE INVENTION

Accordingly, an object of the present invention is to provide a motor structure which allows a motor torque generating section of sufficient size to be used even when a cut-out section is required in the stator unit substrate (stator yoke) for motor assembly purposes.

To this end, there is provided according to one aspect of the present invention a motor including a rotor unit and a stator unit. The rotor unit includes a multipolar rotor magnet; a gear, disposed away from the center of rotation of the rotor unit with respect to the rotor magnet, for transmitting torque of the rotor unit to the outside; and a rotary shaft disposed at the center of rotation. The stator unit includes a substrate, and a plurality of coils disposed facing the rotor magnet on the substrate, the substrate having a cut-out section between at least two of the plurality of coils, with the cut-out section causing the outer peripheral section of the gear to be exposed.

According to another aspect of the present invention, there is provided an electronic apparatus comprising a motor and a transmission gear. The motor includes a rotor unit and a stator unit. The rotor unit includes a multipolar rotator magnet; a gear, disposed away from the center of rotation of the rotor unit with respect to the rotor magnet, for transmitting torque of the rotor unit, and a rotary shaft disposed at the center of rotation. The stator unit includes a substrate, and a plurality of coils disposed facing the rotor magnet on the substrate, the substrate having a cut-out section between at least two of the plurality of coils, with the cut-out section causing the outer peripheral section of the gear to be exposed. The transmission gear is arranged to engage with the gear.

Other objects and features of the present invention will become apparent in the following specification and drawings.

DETAILED DESCRIPTION OF THE PREFERRED EMBODIMENTS

A description will now be given of an embodiment applied to a VTR capstan motor with reference to the drawings.

Figure 1:
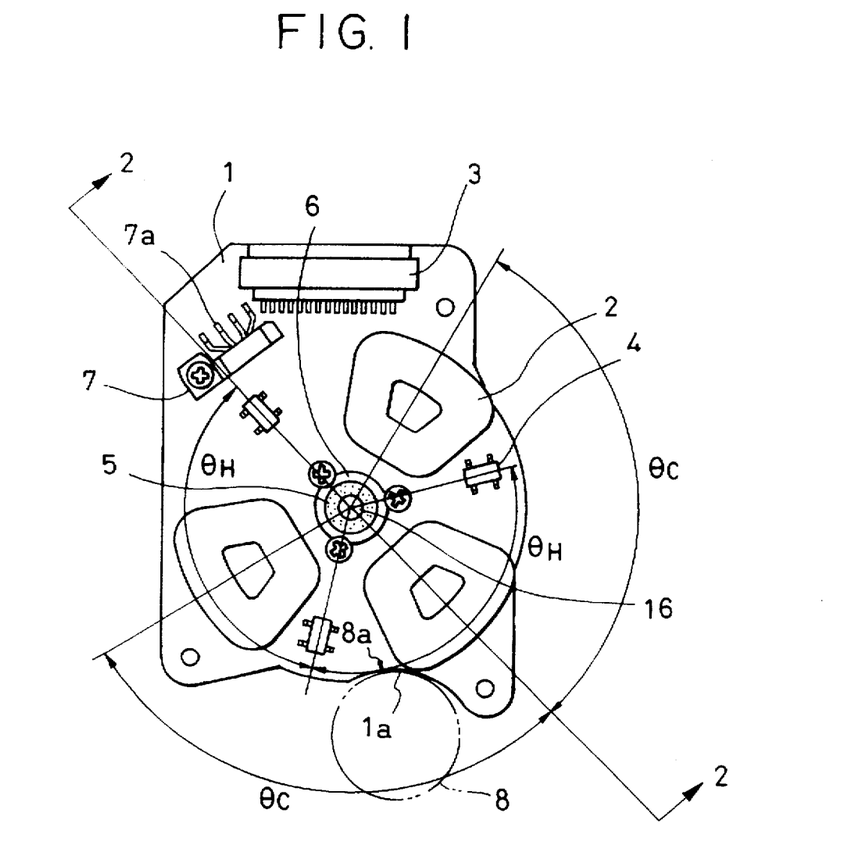
FIG. 1 is illustrative of a stator unit of a capstan motor of an embodiment of the present invention.
Figure 2:
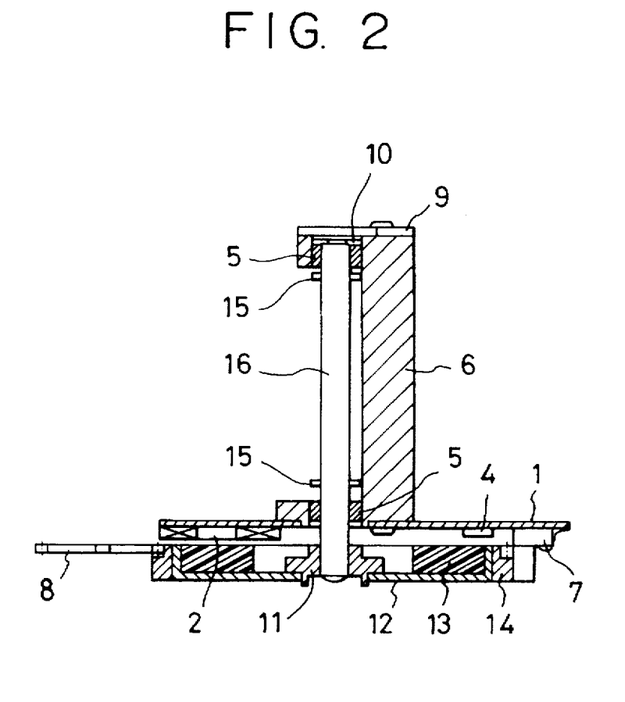
FIG. 2 is a sectional view of the capstan motor of the embodiment of FIG. 1, with the motor being cut at the center along line 2—2.

FIG. 1 is illustrative of the stator unit of the capstan motor of an embodiment of the present invention which corresponds to the stator unit of FIG. 7 and is composed of an iron substrate having a pattern formed on an iron plate which has driving coils placed thereon. FIG. 2 is a cross sectional view of the capstan motor cut at the center along line 2—2. Although not illustrated, the recording medium or tape is transported as it is passed in contact between a capstan shaft 16 and a pinch roller (not shown) disposed facing the capstan shaft 16 of the capstan motor.

Referring to FIGS. 1 and 2, reference numeral 1 denotes a stator substrate (yoke) which is an iron substrate having an insulation layer formed, for example, on an iron plate or silicon steel plate, a copper foil formed on the insulation layer, and a pattern formed by etching. Three driving coils 2 are disposed along the circumference at predetermined phase angles $\theta_c$. Reference numeral 3 denotes a flexible printed board connector for wiring to a motor driving circuit (not illustrated).

Reference numeral 4 denotes Hall devices, which are disposed at predetermined phase angles $\theta_H$, for detecting the rotational phase of a driving rotor magnet. Reference numeral 5 denotes a bearing metal for supporting a capstan shaft 16, while reference numeral 6 denotes a bearing housing for holding the bearing metal.

Reference numeral 7 denotes a magnetic resistance element (hereinafter referred to as "MR element"), which is disposed at the outer periphery at the rotor side, for detecting the rotation period based on the magnetic flux and magnetic field of the plastic rotor magnet magnetized in a predetermined manner at a pitch of less than 0.5 mm along the outer periphery. Reference numeral 7a denotes a lead terminal of the MR element 7. Reference numeral 8 denotes a transmission gear engaging an outer peripheral gear 14, which is disposed along the outer periphery adjacent to the rotor. Reference numeral 1a denotes a cut-out section formed so that the stator yoke 1 does not get in the way when the transmission gear 8 is being assembled. The radius of the outer peripheral gear 14 is smaller than radius R1 (FIG. 3) of each coil 2 to be discussed later. This is apparent from linking section 8a of the gear 8 of FIG. 1.

When, for example, the driving rotor magnet 13 (of FIG. 2) has 8 poles, the phase angles $\theta_C$ at which the driving coils 2 are arranged are in the range of from $\theta_C = 45° + 15° \times (3n-)$ to $\theta_C = 45° + 15° \times (3n-2)$.

In FIG. 1, each phase angle $\theta_c$ is 105°. Each of the three coils 2 must be disposed at a phase angle $\theta_C$ greater than 60° to avoid the cut-out section 1a. Therefore, at least two of the phase angles $\theta_C$ must be greater than 60°.

Although the phase angles $\theta_H$ of the Hall devices 4 can be in the same range as the phase angles of the coils 2, they are determined by $\theta_H = 15° + 45°n$. This is because each Hall device 4 output needs to have an electrical angle phase difference of 30° with respect to the coil 2.

Figure 3:
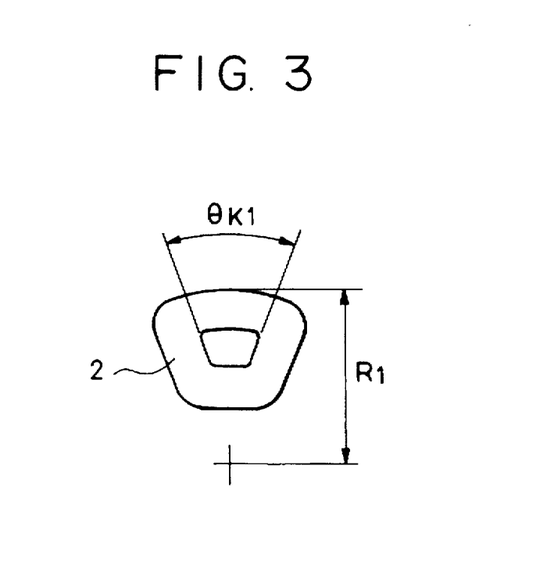
FIG. 3 is illustrative of a driving coil of the embodiment of the capstan motor of FIG. 1.
Figure 4:
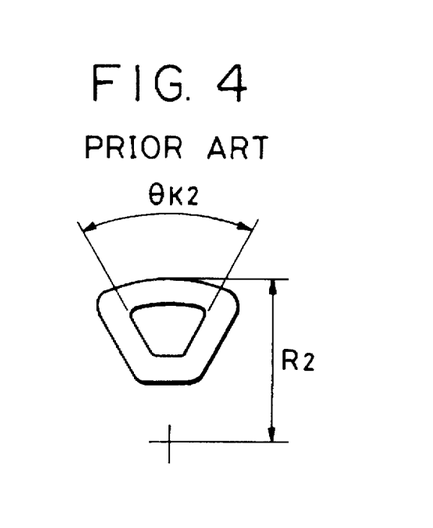
FIG. 4 is illustrative of a driving coil of a conventional capstan motor illustrated in FIGS. 6 and 7.

FIG. 3 is a plan view of the shape of each driving coil 2, while FIG. 4 illustrates the shape of each driving coil 17 of the conventional motor structure shown in FIG. 7, the illustration given for comparison. Comparing the two figures, the outer peripheral radius of each coil, $R_1$, is greater than the outer peripheral radius of each coil, $R_2$, with each open angle $\theta_{K1}$ being less than each open angle $\theta_{K2}$.

The shape of each driving coil 2 of the embodiment is such that the inner open angle $\theta_{K1}$ of each fan-shaped coil is smaller than the angle of magnetization of the driving rotor magnet 13, so that when the number of windings of each coil 2 is increased, the portion along the circumferential dimension that does not cause generation of torque of the motor can be made shorter, thereby preventing an increase in the resistance value.

In the embodiment, the angle of magnetization is 45° when there are eight poles, with the open angle $\theta_{K1}$ being 45°. In the conventional example the open angle $\theta_{K2}$ is 45° to 60°, which is larger than the angle of magnetization. When it is 60 to 90% of the magnetic pole angle, lowered efficiency caused by a phase difference between the torque generation direction and the rotation direction occurs rarely, so that it can be kept down to a range of about 2% or less.

In the conventional example, it is necessary to form a cut-out section 1a in the stator yoke 1 for allowing linkage with the transmission gear 8, so that the outermost peripheral radius $R_2$ (of FIG. 4) is limited with respect to the motor size. In this embodiment, however, since the number of coils is halved, there is more space between the coils, this extra space being used for linking the gear. This makes it possible to make the outer peripheral radius of the coil arrangement to be large as $R_1$ of FIG. 3.

It is possible to reduce the number of coils and increase the outer peripheral radius of the motor, so that narrowing the open angle of each coil 2 and increasing the number of windings makes it possible to produce a better motor providing sufficient torque.

FIG. 2 is a cross sectional view of the capstan motor of the first embodiment of FIG. 1, with the motor cut at the center along line 2—2 . With respect to the stator unit described in FIG. 1, the plastic rotor magnet 13 is disposed facing each driving coil 2 and secured to the capstan shaft 16 through the rotor yoke 12 and a bushing 11.

The outer peripheral gear 14 is secured to the outer periphery of the rotor yoke 12. The gear 14 is formed by the plastic rotor magnet 13 having a gear portion engaging with a transmission gear 8.

A bearing metal 5, which supports the capstan shaft 16, is secured to the bearing housing 6. The suction force between the stator substrate 1 and the rotor magnet 13 is received by a thrust receiver 10 and held.

Figure 5:
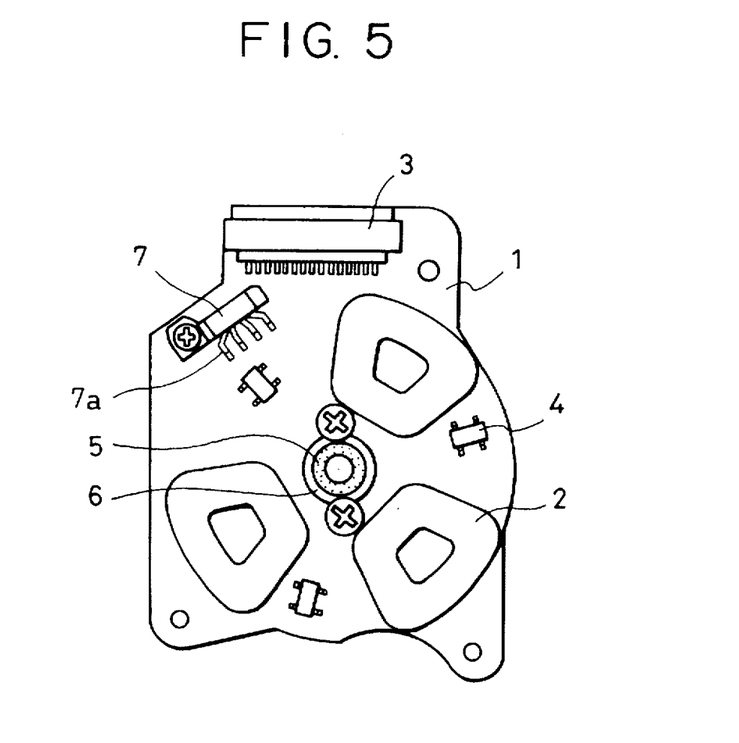
FIG. 5 is illustrative of a stator unit of an embodiment which is an improvement over the aforementioned embodiment.

FIG. 5 is illustrative of an embodiment which is a partial improvement over the aforementioned embodiment. In this embodiment, the MR element terminals 7a is disposed at the inner side of the motor.

The conventional MR element 7 is formed by a magnetic resistance film made of Ni alloy formed on a glass plate or a ceramic plate, and has lead terminals 7a soldered and extended out and connected on the stator substrate 1.

In the FIG. 7 way of connection, the lead terminals protrude out away from the motor, which enlarges only this portion of the motor, so as to result in a problem regarding where the MR element 7 is to be disposed with respect to the mechanical system.

In this embodiment, which is an improvement over the aforementioned embodiment, fewer driving coils 2 allows the MR element 7 to be disposed between coils as well as the lead terminals 7a to be placed on the motor side for connection. In such a construction, the lead terminal sections 7a only protrude out by an insignificant amount from the outer diameter of the motor, making it possible to reduce the size of the mechanical system.

As will be understood from the foregoing description, according to the embodiments, the phases of the gear linking section and the driving coils do not overlap, so that a reduction in the number of driving coils allows larger coils to be used, motor characteristics to be improved, and to provide a cheaper motor.

Making the open angle of the inner side of the aforementioned driving coil shape less than the magnetic pole angle makes it possible to reduce the length of the winding along the circumferential dimension to provide a highly efficient and cheap motor whose resistance does not increase even if a greater number of windings is used.

The lead terminals of the magnetic resistance element do not overlap the driving coils, which allows the lead terminals to be disposed facing the motor, thereby making it possible to reduce the size of the motor.

The individual components shown in outline or designated by blocks in the Drawings are well-known in the electric motor arts, and their specific construction and operation or best mode for carrying out the invention.

While the present invention has been described with respect to what are presently considered to be the preferred embodiments, it is to be understood that the invention is not limited to the disclosed embodiments. To the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. A motor comprising:
a rotor unit including (i) a multipolar rotor magnet, (ii) a gear, disposed away from the center of rotation of said rotor unit with respect to said rotor magnet, for transmitting torque of the rotor unit, and (iii) a rotary shaft disposed at said center of rotation; and
a stator unit including (i) a substrate, and (ii) a plurality of coils disposed on said substrate facing said rotor magnet, said substrate having a cut-out section between at least two of said plurality of coils, with said cut-out section causing the outer peripheral section of said gear to be exposed at a radius from the center of rotation less than an outer radius of said plurality of coils.

2. A motor according to claim 1, wherein said coils are wound around fan-shaped openings, with the angles of said openings being 60 to 90% an angle of magnetization of said rotor magnet.

3. A motor according to claim 1 further comprising a sensor for detecting the rotational phase of said rotor magnet, said sensor being disposed on said substrate and between said coils.

4. A motor according to claim 1 further comprising a sensor for detecting the rotation period of said rotor unit, said sensor being disposed on said substrate and between said coils, with lead terminals of said second sensor being positioned towards said coils.

5. A motor according to claim 1, wherein the number of said coils is three.

6. A motor according to claim 1, wherein said rotary shaft comprises a capstan.

7. An electronic apparatus comprising: (a) a motor including:
a rotor unit including (i) a multipolar rotor magnet, (ii) a gear, disposed away from the center of rotation of said rotor unit with respect to said rotor magnet, for transmitting torque of said rotor unit, and (iii) a rotary shaft disposed at said center of rotation; and
a stator unit including (i) a substrate, and (ii) a plurality of coils disposed facing said rotor magnet on said substrate, said substrate having a cut-out section between at least two of said plurality of coils, with said cut-out section causing the outer peripheral section of said gear to be exposed at a radius from the center of rotation less than an outer radius of said plurality of coils; and (b) a transmission gear arranged to engage with said gear.

8. An apparatus according to claim 7, wherein said coils are wound near fan-shaped openings, with the angles of said openings being 60 to 90% of an angle of magnetization of said rotor magnet.

9. An apparatus according to claim 7 further comprising a sensor for detecting the rotational phase of said rotor magnet, said sensor being disposed on said substrate and between said coils.

10. An apparatus according to claim 7 further comprising a sensor for detecting the rotation period of said rotor unit, said sensor being disposed on said substrate and between said coils, with lead terminals of said second sensor being positioned towards said coils.

11. An apparatus according to claim 7, wherein the number of said coils is three.

12. An apparatus according to claim 7, wherein said rotary shaft comprises a capstan.

13. A motor comprising:
a rotor unit including (i) a multipolar rotor magnet, (ii) a gear, disposed away from the center of rotation of said rotor unit with respect to said rotor magnet, for transmitting torque of the rotor unit, and (iii) a rotary shaft disposed at the center of rotation; and
a stator unit including (i) a substrate, and (ii) a plurality of coils disposed on said substrate facing said rotor magnet, said substrate having a cut-out section between at least two of said plurality of coils,
wherein said gear and said cut-out section are configured so that the outer peripheral section of said gear is exposed, and
wherein a radius of said gear from the center of rotation is smaller than a radius of said plurality of coils, and
wherein phases of a linking area between said gear and a transmission gear linked with said gear and of said plurality of coils do not overlap.

14. A motor according to claim 13, wherein said coils are wound around fan-shaped openings, with the angles of said openings being 60 to 90% of an angle of magnetization of said rotor magnet.

15. An apparatus comprising:
a motor comprising (a) a rotor unit including (i) a multipolar rotor magnet, (ii) a rotor gear, disposed away from the center of rotation of said rotor unit with respect to said rotor magnet, for transmitting torque of the rotor unit, and (iii) a rotary shaft disposed at the center of rotation, and (b) a stator unit including (i) a substrate, and (ii) a plurality of coils disposed on said substrate facing said rotor magnet, said substrate having a cut-out section between at least two of said plurality of coils; and
a transmission gear arranged to engage with said rotor gear,
wherein said rotor gear and said cut-out section are configured so that the outer peripheral section of said rotor gear is exposed, and
wherein a radius of said rotor gear from the center of rotation is smaller than a radius of said plurality of coils, and
wherein phases of a linking area between said rotor gear and said transmission gear and of said plurality of coils do not overlap.

16. An apparatus according to claim 15, wherein said transmission gear and said rotor gear are configured to engage at a radius which is smaller than a radius of said plurality of coils.

17. An apparatus according to claim 15, wherein said coils are wound around fan-shaped openings, with the angles of said openings being 60 to 90% of an angle of magnetization of said rotor magnet.

* * * * *

UNITED STATES PATENT AND TRADEMARK OFFICE
CERTIFICATE OF CORRECTION

PATENT NO. : 5,760,521
DATED : June 2, 1998
INVENTOR(S) : TATSUZO USHIRO

It is certified that error appears in the above-identified patent and that said Letters Patent is hereby corrected as shown below:

On the title page,
At [56] References Cited

"1109275" should read --1-109275--

Column 1

Line 13, "like," should read --like a--; and
Line 32, "thin" should read --thinner--.

Column 3

Line 31, "(3n-)" should read --(3n-1)--; and
Line 39, "+45°n" should read
--+45°n or $\Theta_H = 75° + 45°n$.--

UNITED STATES PATENT AND TRADEMARK OFFICE
CERTIFICATE OF CORRECTION

PATENT NO. : 5,760,521
DATED : June 2, 1998
INVENTOR(S) : TATSUZO USHIRO

It is certified that error appears in the above-identified patent and that said Letters Patent is hereby corrected as shown below:

Column 4

Line 7, "large" should read --as large--; and
    Line 30, "7a is" should read --7a are--.

Column 5

Line 2, before "or" insert --are not critical to the operation or--; and
    Line 29, "90% an" should read --90% of an--.

Signed and Sealed this

Sixteenth Day of February, 1999

Attest:

Attesting Officer

*Acting Commissioner of Patents and Trademarks*